(12) United States Patent
Eiberger

(10) Patent No.: US 7,929,015 B2
(45) Date of Patent: Apr. 19, 2011

(54) INFRARED SCANNING OF SPROCKET HOLES

(75) Inventor: Berthold Eiberger, Ober-Ramstadt (DE)

(73) Assignee: DFT Digital Film Technology Holding GmbH, Weiterstadt (DE)

( * ) Notice: Subject to any disclaimer, the term of this patent is extended or adjusted under 35 U.S.C. 154(b) by 2531 days.

(21) Appl. No.: 09/110,615

(22) Filed: Jul. 6, 1998

(65) Prior Publication Data
US 2001/0043267 A1     Nov. 22, 2001

(30) Foreign Application Priority Data

Jul. 23, 1997   (DE) ................... 197 31 531

(51) Int. Cl.
*H04N 9/47*     (2006.01)

(52) U.S. Cl. ............... 348/96; 348/61; 348/97

(58) Field of Classification Search ............ 348/61, 348/96, 97; 358/471, 474; 355/38, 41; 356/237.6
See application file for complete search history.

(56) References Cited

U.S. PATENT DOCUMENTS

| | | | | |
|---|---|---|---|---|
| 4,652,125 | A * | 3/1987 | Bowen et al. | 356/237.6 |
| 4,845,531 | A * | 7/1989 | Nagano | 355/38 |
| 4,875,102 | A * | 10/1989 | Poetsch | 348/97 |
| 5,519,510 | A * | 5/1996 | Edgar | 358/471 |

FOREIGN PATENT DOCUMENTS

DE          3819496 C2     1/1989

* cited by examiner

*Primary Examiner* — Allen Wong
(74) *Attorney, Agent, or Firm* — Henry M. Feiereisen; Ursula B. Day

(57) ABSTRACT

To be able to scan the sprocket holes of a film with improved precision by means of a film scanner, in which a correction signal is generated for compensating picture steadiness errors, it is proposed that the light source generates light in the infrared range, and that the scanning sensor(s) is (are) sensitive in the infrared range.

10 Claims, 2 Drawing Sheets

INFRARED SCANNING OF SPROCKET HOLES

CROSS-REFERENCES TO RELATED APPLICATIONS

This application claims the priority of German Patent Application, Serial No. 19731531.3, filed Jul. 23, 1997, pursuant to 35 U.S.C. 119(a)-(d).

BACKGROUND OF THE INVENTION

The invention relates to a film scanner comprising a first scanning device for scanning frames of a cinematographic film by means of photoelectric transducers, and a second scanning device for scanning the sprocket holes. The invention also relates to scanning devices as such and to a method of scanning the sprocket holes in a cinematographic film.

To convert cinematographic film material into electronic signals, a film in a film scanner is passed along or through an opto-electronic scanning device. This poses the long-standing problem of maintaining the frame position of successively scanned frames constant. The partly periodical, partly statistic fluctuations of the frame position, which are referred to as picture steadiness errors or film weave, may have different causes. These errors may be, for example positioning errors in both the pick-up camera and in the negative/positive copying machine. However, also frame position errors and tracking errors of the film scanner may lead to further steadiness errors.

To reduce picture steadiness errors, there are different formulations for solutions as described, for example, in DE 38 19 496 C2 in which a sprocket hole which is assignable to a film frame is scanned by means of a cathode ray generated by a cathode ray tube and serves as a reference point for each scanned frame. Dependent on the position of a sprocket hole determined in this manner, a correction signal for correcting the horizontal lateral irregularity is generated. Here, the problem is encountered that in given film material the quantity of light passing through the film is approximately the same as the quantity of light transmitted through the sprocket hole. This problem occurs, for example in negative film material which has an orange basic color. To solve this problem, it is proposed to use green-sensitive photocells for scanning the sprocket hole in this case, because these cells, as compared with the red and blue sensitive photocells, supply a signal with the smallest electronic interference.

A problem in film scanners with optical scanning of the sprocket hole is that the first scanning device for scanning the film frames may be disturbed by light scattered by the second scanning device for scanning the sprocket holes. In fact, the operations of scanning the sprocket holes and scanning the frame are preferably performed simultaneously at the same location, which presupposes a narrow spatial proximity of the areas where light occurs and passes through for detecting the sprocket holes and for scanning the frames. It is ensured only by the narrow spatial and temporal proximity of the two scanning operations that the offset errors determined during the operation of scanning the sprocket holes also correspond to the offset errors of the scanned frames. However, such a spatial proximity led to problems with scattered light in known scanning operations.

SUMMARY OF THE INVENTION

It is therefore an object of the invention to provide a scanning device in which the scanning device for scanning film frames is not disturbed by the scanning device for scanning sprocket holes.

This object is solved in that the spectral sensitivities of the first and second scanning devices are chosen to be such that they lie in maximally different spectral ranges. This can be achieved, for example in that the photoelectric transducers of the first scanning device, which are sensitive when scanning color films in the red, green and blue spectral range, are chosen to be such that they have relatively narrow spectral sensitivities. If a light current whose color spectrum does not coincide with any of the photoelectric transducers of the first scanning device used for scanning the film frame is used for illuminating or transilluminating the sprocket hole, light scattered onto the photoelectric transducers of the first scanning device by the light current used for scanning the sprocket hole can no longer cause any disturbance.

If the film frame and the sprocket hole are illuminated by means of a common light source, the light spectrum of the light current used for illuminating the sprocket hole can be obtained by an optical filter inserted in the radiation path of this light current. Another solution is to illuminate film frame and sprocket hole by means of two light sources, using light sources with different light spectra. Similarly, the spectral sensitivity of the photoelectric transducers can be obtained by filters preceding the photoelectric transducers.

It is a further object of the invention to provide a film scanner and a scanning device for a film scanner by means of which the edges of sprocket holes can be determined as accurately as possible.

This object is solved in that, for illuminating the sprocket holes, a light source is provided whose light spectrum lies in the infrared spectral range, and in that the photoelectric transducer provided for scanning the sprocket hole is sensitive in the infrared range.

It has surprisingly been found that when illuminating with infrared light or light which comprises infrared spectral components, the scanning signal obtained in the infrared spectral range has an attenuation maximum in the area of the edge of the sprocket hole so that the edge can be detected in a particularly simple manner. The cause of this attenuation maximum seems to be that a change of material occurs at the area of the edges of the sprocket hole during the punching process. This change of material becomes manifest by a reduction of the material transparency in the infrared spectral range.

An infrared light-emitting diode is particularly suitable as a light source.

The invention has the further advantage that, due to the illumination or transillumination of the sprocket hole with infrared light only, problems of scattered light in the frame sensors are obviated. Since the (color) frame sensors are selectively sensitive in the red, blue and green spectral range, infrared light scattered by the light source for scanning the sprocket holes does not affect the frame scanning process to such an extent as an illumination of the sprocket hole with light in the visible spectrum. For the case where the sensors provided for frame scanning should also be sensitive in the infrared spectral range, this problem can be very easily solved by an infrared cut-off filter preceding the frame scanning sensors.

BRIEF DESCRIPTION OF THE DRAWING

These and other aspects of the invention are apparent from and will be elucidated with reference to the embodiments described hereinafter.

In the drawings.

DETAILED DESCRIPTION OF PREFERRED EMBODIMENTS

Figure 1:
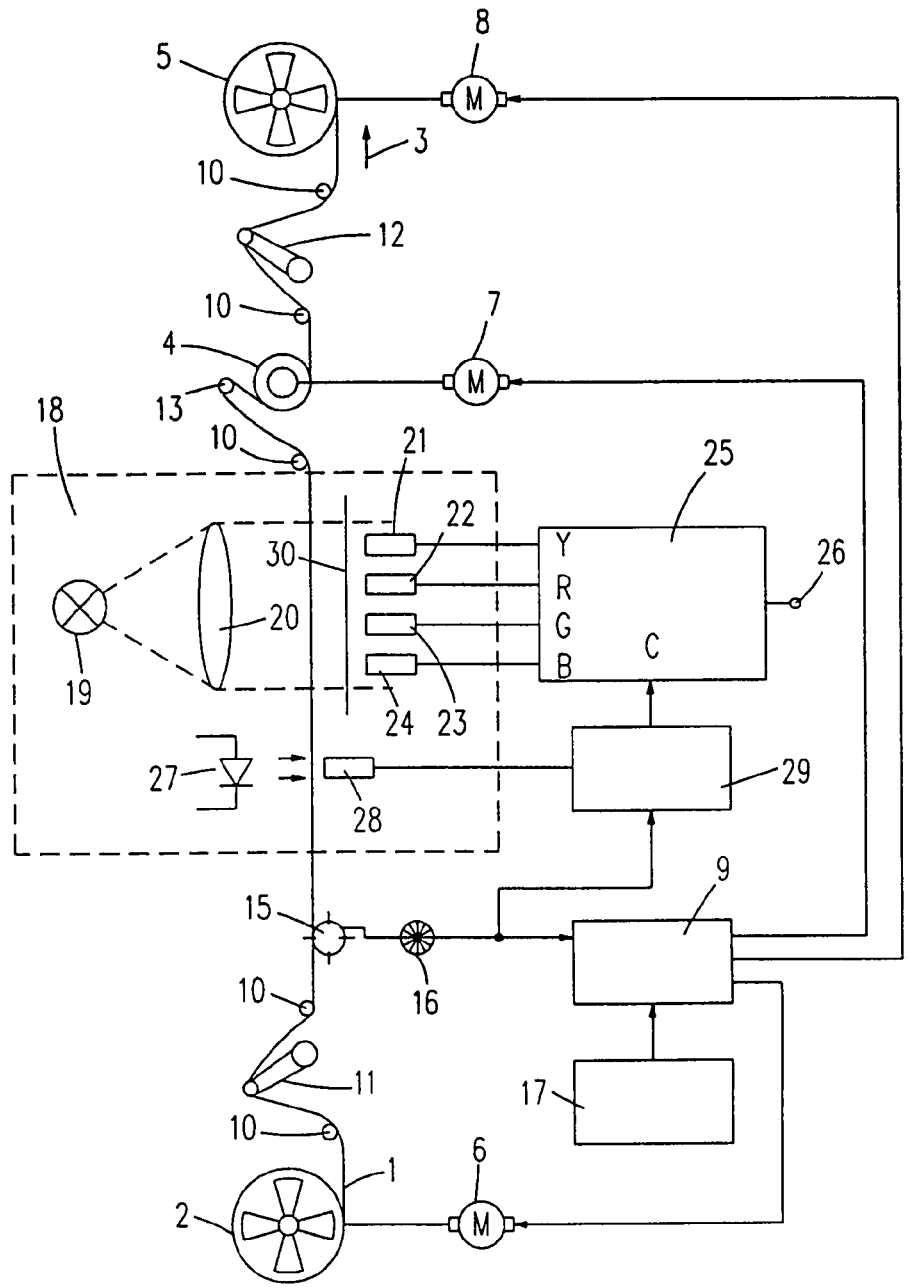
FIG. 1 shows a film scanner.

FIG. 1 is an embodiment of a film scanner with its essential parts and their co-operation with a detector circuit according to the invention for detecting sprocket holes. A film 1 is fed from a supply reel 2 in the direction of the arrow 3, via a capstan 4 to a take-up reel 5. Supply reel 2, capstan 4 and take-up reel 5 are driven by means of electromotors 6, 7, 8 which are controlled by a film feed control device 9. To this end, the film tension is measured by means of a first sensor lever 11 which is arranged in the film drive path proximate to the supply reel 2. The measured film tension is applied to the film feed control device 9 which controls the supply reel motor 6 by means of an internal control circuit in such a way that a possibly constant film run is ensured. By means of a second sensor lever 12 arranged proximate to the take-up reel 5, the film tension is similarly controlled via the take-up reel motor 8 in the film take-up process. Various guidance rolls 10 predetermining the film drive path of the film 1 are arranged in the path of the film.

For optically scanning a film 1, the film 1 is guided by means of a swivable guidance roll 13 in such a way that it partially winds around the capstan. The film feed rate is thereby exclusively predetermined by the capstan 4 and its capstan motor 7.

To control the film feed rate during scanning, a sprocket 15 rigidly connected to a tacho-disc 16 is arranged as a speed sensor in the film drive path. The tacho-disc 16 supplies pulse signals (hereinafter referred to as tacho-pulses) in conformity with the film speed, which pulses are applied to the film feed control device 9. Dependent on parameters set by means of an operating panel 17 and the tacho-pulses supplied by the tacho-disc 16, control signals for driving the capstan motor 7 are generated.

During film feed, the film 1 is passed through a scanning unit 18 in which the film 1 is illuminated by means of an illumination device diagrammatically shown as a lamp 19 and a condensor 20. The light which is modeled by the image contents of the film 1 is scanned via frame scanning sensors 21, 22, 23 and 24. The first scanning sensor 21 is used for scanning a luminance signal W, and the other scanning sensors 22, 23 and 24 are used for scanning the chrominance component signals RGB. Luminance signal W and chrominance component signals RGB are applied to a video signal processing unit 25 in which the received signals are converted into the desired video signal format and are available in a studio standard at an interface 26.

Before the film 1 is opto-electronically converted in the scanning unit 18, it passes through an arrangement for detecting picture steadiness errors. In this embodiment, this arrangement is constituted by a second illumination device 27 on one side of the film 1, a sprocket hole sensor 28 on the other side of the film and a computing unit 29. A line camera which may be added as an independent unit, is also suitable as a sprocket hole sensor 28. The imaging optics of such a camera should preferably have telecentric properties because scanning points located in the depth of field of the optical system can be imaged without changing the criteria. Movements of the film perpendicularly to the film plane thus do not cause any errors within the depth of field of the optical system when the deviation of the frame position is computed.

Figure 3:
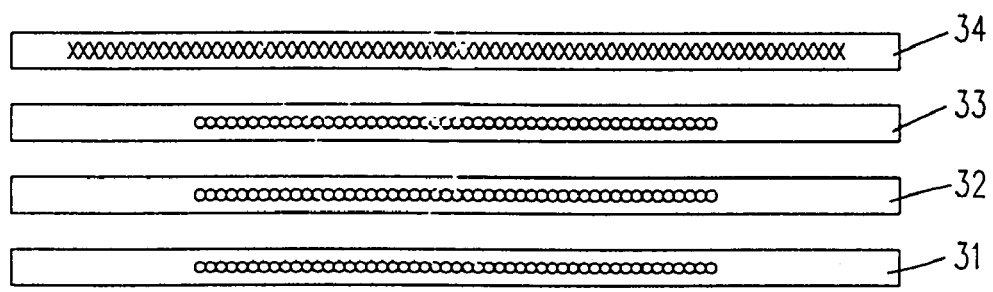
FIG. 3 shows an arrangement of CCD line sensors.

A further possibility is to use a CCD line sensor as sprocket hole sensor 28. FIG. 3 shows, for example an arrangement consisting of four CCD line sensors, in which the first three line sensors 31, 32, 33 are sensitive in the red, blue and green spectral range (the individual cells are denoted by "o"), and a fourth sensor 34 which is sensitive in the infrared spectral range (whose individual cells are denoted by "X"). It is also feasible to use other arrangements in which the CCD line sensor has infrared-sensitive cells only in the range of the sprocket holes to be expected, in which the infrared-sensitive cells are combined with a high-resolution detail sensor, or CCD line sensors which are separated for the right and left sprocket hole.

The computing unit 29 evaluates the output signals of the sprocket hole sensor 28 and generates correction signals C for horizontal and vertical picture steadiness errors, which signals are applied to the video signal processing unit 25. By means of the correction signals C, each individual video frame can be offset in its horizontal and vertical position in known manner during the signal conversion and the relevant picture steadiness error can be corrected.

Since the sprocket holes assigned to a frame are generally produced in a punching process, the geometrical dimensions of the holes assigned to each frame are constant. In the embodiment, the sprocket hole is illuminated with an infrared light source, for example an infrared diode for scanning the sprocket hole and scanned with an infrared-sensitive line sensor. An infrared cut-off filter 30 which is transmissive in the range of visible light is arranged between the scanned film 1 and the scanning sensors 21, 22, 23 and 24. In this way, it is avoided that the light used for illuminating the sprocket hole disturbs the scanning sensors 21, 22, 23 and 24.

Figure 2:
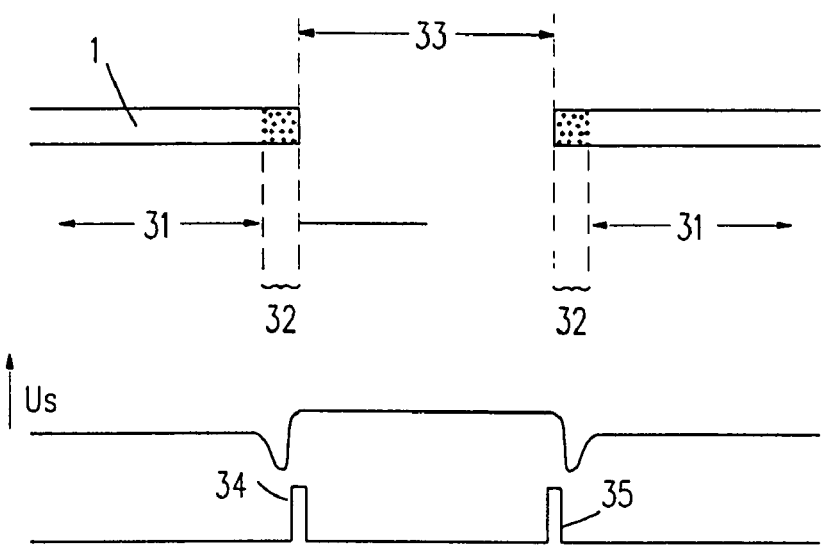
FIG. 2 shows a transmission curve of a sprocket hole in the infrared range.

FIG. 2 is a longitudinal section through a film material 1 with areas 31 in which the film material has a normal transparency. Areas 32 in which the transparency of the film material is decreased due to the punching process, and the area 33 of a sprocket hole. Pictured below it is the output voltage $U_s$ of the sprocket hole sensor 29 at the same position in the film feed direction. The change of the signal variation is preferably detected by means of a differentiator circuit. FIG. 2 shows the relevant pulsatory signal peaks 34, 35 obtained by means of a gradient method and applied as scanning values to the computing unit 29.

What is claimed is:

1. A film scanner comprising:
    a first scanning device having a first light source emitting light in the visible spectral range for scanning frames of a cinematographic film by means of photoelectric transducers, and
    a second scanning device having a second light source for scanning sprocket holes, said second light source generating light in the infrared spectral range, and a photoelectric transducer being sensitive in the infrared spectral range,
    wherein the spectral sensitivities of the first and second scanning devices lie in non-overlapping spectral ranges, and wherein the second scanning device is configured to detect both the beginning and the end of the sprocket holes, said beginning and end of the sprocket holes defined by an edge region surrounding the sprocket holes exhibiting an increase in optical attenuation in the infrared spectral range that is different from the optical attenuation of both the film and the sprocket holes.

2. A film scanner as claimed in claim 1, further comprising an optical filter preceding at least one of the photoelectric transducers detecting light in one of the visible spectral range and the infrared spectral range and constructed to block light incident on the photoelectric transducer detecting light in the other of the infrared spectral range and the visible spectral range.

3. A film scanner as claimed in claim 1, wherein said first and second light sources comprise a common light source, while at least one of the light radiation paths of the first and second scanning devices incorporates an optical filter for producing the non-overlapping spectral ranges.

4. A film scanner comprising:
    a first scanning device for scanning frames of a cinematographic film in a visible spectral range by means of photoelectric transducers, and
    a second scanning device for scanning sprocket holes and areas around sprocket holes in the infrared spectral range, which is non-overlapping with the visible spectral range, wherein the second scanning device is configured to detect both the beginning and the end of the sprocket holes, said beginning and end of the sprocket holes defined by an edge region surrounding the sprocket holes exhibiting an increase in optical attenuation in the infrared spectral range that is different from the optical attenuation of both the film and the sprocket holes.

5. The film scanner of claim 4, wherein an optical filter precedes at least one of the photoelectric transducers detecting light in one of the visible spectral range and the infrared spectral range, said optical filter constructed to block light incident on the photoelectric transducer detecting light in the other of the infrared spectral range and the visible spectral range.

6. The film scanner of claim 4, wherein a common light source is provided for the first and the second scanning device, while at least one of the light radiation paths of the scanning devices incorporates an optical filter for producing the non-overlapping spectral ranges.

7. The film scanner of claim 4, comprising separate light sources for the first and second scanning devices the light sources.

8. The film scanner of claim 4, wherein the light source is an infrared light emitting diode.

9. A film scanner comprising:
a first scanning device for scanning frames of a cinematographic film by means of photoelectric transducers in a visible spectral range, and
a second scanning device for scanning sprocket holes and areas around sprocket holes in the infrared spectral range, where the spectral sensitivities of the first and second scanning devices lie in non-overlapping spectral ranges, and wherein the second scanning device is configured to detect a change in density of edge regions of the cinematographic film surrounding the sprocket holes, said edge regions exhibiting an increase in optical attenuation in the infrared spectral range that is different from the optical attenuation of both the film and the sprocket holes.

10. A film scanner comprising:
a first scanning device having a first light source for scanning frames of a cinematographic film by means of photoelectric transducers in a visible spectral range, and
a second scanning device having a second light source for scanning sprocket holes and areas around sprocket holes in the infrared spectral range, where the spectral sensitivities of the first and second scanning devices lie in non-overlapping spectral ranges, and wherein the second scanning device is configured to detect a change in density of edge regions of the cinematographic film surrounding the sprocket holes, said edge regions exhibiting an increase in optical attenuation in the infrared spectral range that is different from the optical attenuation of both the film and the sprocket holes.

* * * * *

UNITED STATES PATENT AND TRADEMARK OFFICE
CERTIFICATE OF CORRECTION

PATENT NO.         : 7,929,015 B2                                    Page 1 of 1
APPLICATION NO.    : 09/110615
DATED              : April 19, 2011
INVENTOR(S)        : Berthold Eiberger It is certified that error appears in the above-identified patent and that said Letters Patent is hereby corrected as shown below:

Column 5, claim 7, line 21: after "devices" delete "the light";

Column 5, claim 7, line 22: delete "sources".

Signed and Sealed this
Thirteenth Day of September, 2011

David J. Kappos
*Director of the United States Patent and Trademark Office*